Dec. 24, 1968  H. VISSERS  3,417,579

COUPLING SHAFTS

Filed May 9, 1967

INVENTOR

HERBERT VISSERS

BY *Inwine & Smiley*

ATTORNEYS

United States Patent Office

3,417,579
Patented Dec. 24, 1968

3,417,579
COUPLING SHAFTS
Herbert Vissers, Nieuw-Vennep, Netherlands, assignor to Landbouwwerktuigen Machinefabriek H. Vissers N.V., Nieuw-Vennep, Netherlands, a company of the Netherlands
Filed May 9, 1967, Ser. No. 637,201
Claims priority, application Netherlands, July 14, 1966, 6609891; Feb. 20, 1967, 6702507
2 Claims. (Cl. 64—32)

ABSTRACT OF THE DISCLOSURE

The invention relates to a coupling shaft, which at least at one of its ends is provided with a universal joint and enclosed by a tubular protecting sheath which at least at one of its ends is supported on the shaft by means of a sleeve of synthetic material, said sleeve engaging by means of an inwards projecting ridge an annular groove of the shaft and at least at one end of the tubular sheath a cap widening towards its free end is secured. Said sleeve at its outer circumference on its whole or substantially whole length lies against the inner wall at the narrow end of the cap.

---

Coupling shafts of this kind should be protected by a tubular sheath enclosing the shaft and prevented from rotating with the shaft. With such a coupling shaft it has been proposed to support the protecting tubular sheath at least at one of its ends on the shaft by means of a sleeve of synthetic material, said sleeve engaging by means of an inwards projecting ridge an annular groove of the shaft and at least at one end of the tubular sheath a cap widening towards its free end is secured.

The invention has for its object to support the protecting sheath on the coupling shaft in such a manner that said support is adapted to take up axial forces acting on the sheath. According to the invention the sleeve of synthetic material at its outer circumference on its whole or substantially whole length lies against the inner wall at the narrow end of the cap and the cap at said end is provided with an axial annular recess in which the end of the protecting sheath fits and a clamping ring is placed around recessed end of the cap. With said construction the sleeve located in the cap at the thickened end thereof cannot resiliently expand, so that the sleeve is secured against axial displacement on the shaft. The sleeve, however, may easily be placed on the shaft and the sheath with the cap may readily be clamped on the sleeve by means of the clamping ring, whereby a simple detachable connection of the sleeve in the protecting sheath is obtained, which makes it possible to easily replace the sleeve.

The invention will be further described with reference to the accompanying drawing illustrating an embodiment of a coupling shaft with a protecting sheath according to the invention.

Figure 1:
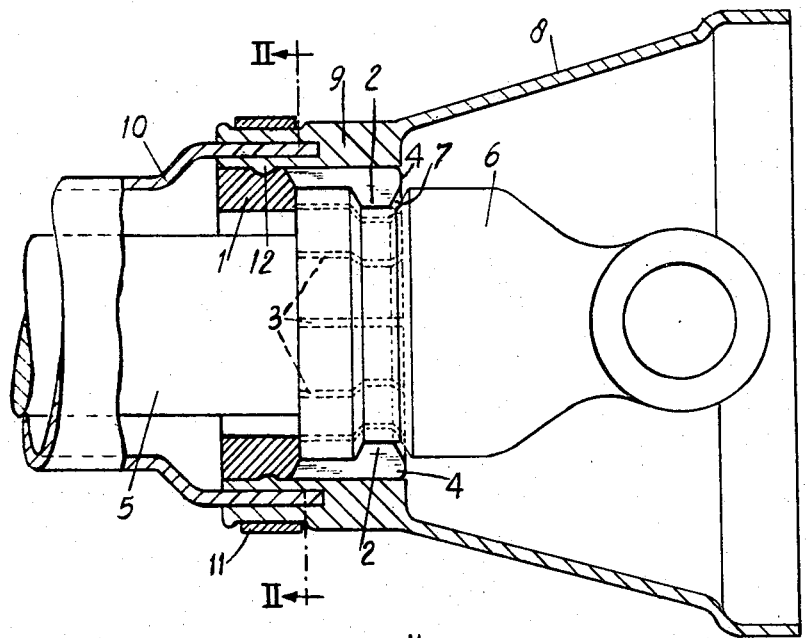
Figure 2:
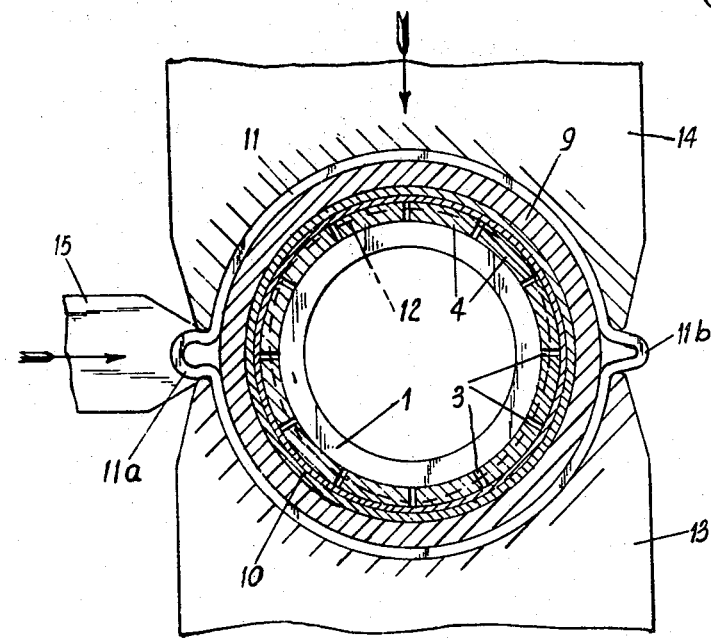

In the drawing FIG. 1 is a longitudinal section of the end portion of the sheath with the cap and FIG. 2 is a cross-sectional view on enlarged scale taken on line II—II in FIG. 1 during the clamping step for the clamping ring.

The sleeve 1 consisting of synthetic resin such as nylon has an inwards directed ridge 2 and said part of the sleeve is provided with slots 3, whereby jaws 4 are obtained adapted to resiliently expand. Thereby it is possible to place the sleeve 1 on the yoke 6 of the universal joint secured on the shaft 5 until the jaws 4 with their ridge engage in a circumferential groove 7 of the yoke 6. After mounting the protecting cap 8 the sleeve 1 on its whole width lies against the inner side of the narrow end 9 of the cap, so that the jaws 2 cannot radially expand, so that the sleeve 1 is secured against axial displacement on the shaft 5, 6.

The protecting sheath 10 which may consist of a suitable kind of synthetic resin with its one end is placed in an axial annular recess at the narrow end 9 of the cap 8, which also may consist of synthetic resin. The cap 8 by means of a clamping ring 11 is clamped on the sheath 10 and on the sleeve 1. As a bead 12 is provided at the inner side of the narrow end 9 of the cap 8 and engages in a corresponding annular groove at the outer circumference of the sleeve 1 said sleeve is secured in the cap 8 against axial displacement.

The clamping ring 11 may consist of a metal strip, which is bent around the thickened end 9 of the cap 8 and the ends of said strip being pulled towards each other by means of a clamping screw. Also an uninterrupted circular clamping ring having such an inner diameter that it may easily be placed on the thickened end 9 of the cap can be used. The clamping of said uninterrupted ring on the cap 8 may be carried out as follows.

The cap with its thickened end 9 is placed on a lower die 13 whereafter an upper die 14 is forcedly moved downwards and thereby V-shaped projections 11a and 11b are formed at the clamping ring 11. The projection 11a finally obtains a circular shape by means of a lateral stamp 15. Said circular projection 11a is more suitable for taking up a chain not shown on the drawing and preventing the cap and the sheath from rotating with the shaft 5.

Preferably the upper die 14 is pivotal with respect to the lower die 13 about an axis located at the place of the projection 11b. With said arrangement during the stamping step only the projection 11a for securing a chain to the cap 8 is obtained. The suppression of the superfluous projection 11b results in a slight saving of material.

It is to be noted that the sleeve 1 may consist of two halves so that the slots in the annular ridge 2 may be omitted. The possibility of radial expansion of said ridge may also be obtained by using an integral sleeve provided with a single slot extending throughout its whole width.

What I claim is:

1. Coupling shaft which at least at one of its ends is provided with a universal joint and enclosed by a tubular protecting sheath with at least at one of its ends supported on the shaft by means of a sleeve of synthetic material engaging by means of an inwards projecting ridge an annular groove of the shaft, and at least at one end of the tubular sheath a cap, widening towards its free, end is secured, characterized in, that the sleeve at its outer circumference on its whole or substantially whole length lies against the inner wall at the narrow end of the cap, and the cap at said end is provided with an axial annular recess in which the end of the protecting sheath fits and a clamping ring is placed around said recessed end of the cap.

2. Coupling shaft as claimed in claim 1, characterized in, that an uninterrupted clamping ring having an inner diameter exceeding the outer diameter of the narrow end of the cap is placed on said narrow end and is clamped on said end by forming one or more projections at the circumference of the ring.

References Cited

UNITED STATES PATENTS 3,091,101  5/1963  Atkinson _____ 64—4
3,344,618  10/1967  Young _____ 64—3

FOREIGN PATENTS 899,511  6/1962  Great Britain.

HALL C. COE, *Primary Examiner.*